(12) United States Patent
Fischmann (10) Patent No.: US 8,753,520 B1
(45) Date of Patent: Jun. 17, 2014

(54) LOCALIZED DISINFECTION SYSTEM FOR LARGE WATER BODIES

(71) Applicant: Crystal Lagoons (Curacao) B.V., Curacao (NL)

(72) Inventor: Fernando Benjamin Fischmann, Santiago (CL)

(73) Assignee: Crystal Lagoons (Curacao), B.V., Curacao (NL)

( * ) Notice: Subject to any disclaimer, the term of this patent is extended or adjusted under 35 U.S.C. 154(b) by 0 days.

(21) Appl. No.: 13/955,699

(22) Filed: Jul. 31, 2013

Related U.S. Application Data (63) Continuation of application No. PCT/EP2012/076170, filed on Dec. 19, 2012.

(51) Int. Cl.
*C02F 1/50* (2006.01)
*C02F 1/66* (2006.01)

(52) U.S. Cl.
USPC ..... 210/742; 210/743; 210/747.5; 210/747.9; 210/764

(58) Field of Classification Search
USPC ........... 210/96.1, 149, 170.09, 170.1, 170.11, 210/242.1, 709, 739, 747.1, 747.5, 747.9, 210/749, 790, 742, 743, 764
See application file for complete search history.

(56) References Cited

U.S. PATENT DOCUMENTS

| | | | |
|---|---|---|---|
| 2,071,520 A * | 2/1937 | Harrison | ........................ 405/107 |
| 2,141,811 A | 12/1938 | Everson | |
| 2,314,767 A | 3/1943 | Burrell | |
| 2,646,889 A | 7/1953 | August | |
| 2,923,954 A | 2/1960 | Babcock | |
| 3,132,773 A | 5/1964 | Hampton | |
| 3,247,053 A | 4/1966 | Hodge | |
| 3,266,631 A | 8/1966 | Snaper | |
| 3,317,925 A | 5/1967 | Vance | |
| 3,361,150 A | 1/1968 | Horner | |
| 3,412,862 A | 11/1968 | Chaplin | |
| 3,406,416 A | 12/1968 | Presby et al. | |
| 3,419,916 A | 1/1969 | Schankler | |
| 3,470,091 A | 9/1969 | Budd et al. | |
| 3,540,274 A | 11/1970 | Shore | |
| 3,641,594 A | 2/1972 | Hough | |
| 3,660,957 A | 5/1972 | Schankler | |
| 3,695,434 A * | 10/1972 | Whitten, Jr. | ............... 210/747.5 |

(Continued)

FOREIGN PATENT DOCUMENTS

CN    1256250    6/2000
CN    102092824    6/2011

(Continued)

OTHER PUBLICATIONS

African Regional Intellectual Property Organization (ARIPO) report for corresponding application No. AP/P/2007/004242 dated Dec. 7, 2010.

(Continued)

*Primary Examiner* — Joseph Drodge
(74) *Attorney, Agent, or Firm* — Merchant & Gould P.C.

(57) ABSTRACT

The present disclosure relates to a method for controlling the microbiological properties of a portion of water within a large body of water by treating such zone with chemical agents, according to the temperature of the water, its salinity, its dilution power and the diffusion of chemicals within the large water body.

19 Claims, 2 Drawing Sheets

(56) References Cited

U.S. PATENT DOCUMENTS

| | | | |
|---|---|---|---|
| 3,748,810 A | 7/1973 | Mattingly | |
| 3,788,982 A | 1/1974 | Zsoldoes, Jr. et al. | |
| 3,844,760 A | 10/1974 | Nelson | |
| 3,887,666 A | 6/1975 | Heller et al. | |
| 3,950,809 A | 4/1976 | Schatzmann | |
| 4,060,575 A | 11/1977 | Uhlirsch et al. | |
| 4,090,266 A | 5/1978 | Price | |
| 4,100,641 A | 7/1978 | Pansini | |
| 4,119,535 A | 10/1978 | White | |
| 4,129,904 A | 12/1978 | Pansini | |
| 4,176,058 A | 11/1979 | Grobler | |
| 4,254,525 A | 3/1981 | Combest | |
| 4,254,818 A | 3/1981 | Melamed | |
| 4,263,759 A | 4/1981 | Miller | |
| 4,304,022 A | 12/1981 | Sommer | |
| 4,306,967 A | 12/1981 | Trautwein | |
| 4,338,697 A | 7/1982 | Broadwater | |
| 4,343,696 A | 8/1982 | Hung | |
| 4,402,101 A | 9/1983 | van Zyl | |
| 4,464,215 A | 8/1984 | Cogliano | |
| 4,519,914 A | 5/1985 | Etani | |
| 4,581,075 A | 4/1986 | St. Martin | |
| 4,640,784 A | 2/1987 | Cant | |
| 4,652,378 A | 3/1987 | Marikovsky et al. | |
| 4,692,956 A | 9/1987 | Kassis | |
| 4,752,740 A | 6/1988 | Steininger | |
| 4,767,511 A | 8/1988 | Aragon | |
| 4,768,532 A | 9/1988 | Johnson | |
| 4,776,053 A | 10/1988 | Kiraly | |
| 4,835,810 A | 6/1989 | Hugo | |
| 4,849,024 A | 7/1989 | Supra | |
| 4,880,547 A | 11/1989 | Etani | |
| 4,889,622 A | 12/1989 | Newcombe-Bond | |
| 4,931,187 A | 6/1990 | Derham et al. | |
| 4,948,296 A | 8/1990 | Salter | |
| 4,952,398 A | 8/1990 | Tapin | |
| 5,028,321 A | 7/1991 | Stone et al. | |
| 5,039,427 A | 8/1991 | Conover | |
| 5,106,229 A | 4/1992 | Blackwell | |
| 5,107,872 A | 4/1992 | Meincke | |
| 5,108,514 A | 4/1992 | Kisner | |
| 5,143,623 A | 9/1992 | Kroll | |
| 5,172,445 A | 12/1992 | Chandler | |
| 5,245,723 A | 9/1993 | Sommer | |
| 5,268,092 A | 12/1993 | Eden | |
| 5,293,659 A | 3/1994 | Rief et al. | |
| 5,337,434 A | 8/1994 | Erlich | |
| 5,342,570 A | 8/1994 | Ledoux et al. | |
| 5,346,566 A | 9/1994 | White | |
| 5,398,361 A | 3/1995 | Cason | |
| 5,422,014 A * | 6/1995 | Allen et al. | 210/743 |
| 5,454,129 A | 10/1995 | Kell | |
| 5,569,371 A | 10/1996 | Perling | |
| 5,616,239 A * | 4/1997 | Wendell et al. | 210/86 |
| 5,662,940 A | 9/1997 | Hight et al. | |
| 5,782,480 A | 7/1998 | Phillips | |
| 5,802,631 A | 9/1998 | Friedman | |
| 5,842,243 A | 12/1998 | Horvath et al. | |
| 5,985,156 A | 11/1999 | Henkin et al. | |
| 6,017,400 A | 1/2000 | Clark et al. | |
| 6,149,819 A | 11/2000 | Martin et al. | |
| 6,228,272 B1 | 5/2001 | Gola | |
| 6,231,268 B1 | 5/2001 | Hausenbauer | |
| 6,280,639 B1 | 8/2001 | Ortiz | |
| 6,284,144 B1 | 9/2001 | Itzhak | |
| 6,303,038 B1 | 10/2001 | Sanders et al. | |
| 6,317,901 B1 | 11/2001 | Corpuel | |
| 6,409,926 B1 | 6/2002 | Martin | |
| 6,419,840 B1 | 7/2002 | Meincke | |
| 6,444,176 B1 | 9/2002 | Yoshinaga et al. | |
| 6,539,573 B1 | 4/2003 | Caccavella | |
| 6,896,799 B2 | 5/2005 | Ohanian | |
| 7,189,314 B1 * | 3/2007 | Pace et al. | 204/412 |
| 7,252,843 B2 | 8/2007 | Moore et al. | |
| 7,820,055 B2 * | 10/2010 | Fischmann Torres | 210/709 |
| 7,832,959 B1 * | 11/2010 | Groen et al. | 405/52 |
| 7,862,712 B2 | 1/2011 | Tak | |
| 8,062,514 B2 * | 11/2011 | Fischmann Torres | 210/167.15 |
| 8,070,942 B2 * | 12/2011 | Fischmann Torres | 210/167.16 |
| 8,153,010 B2 | 4/2012 | Duarte et al. | |
| 8,388,837 B2 | 3/2013 | Tormaschy et al. | |
| 8,454,838 B2 * | 6/2013 | Fischmann T. | 210/742 |
| 8,465,651 B2 * | 6/2013 | Fischmann T. | 210/747.5 |
| 8,518,269 B2 * | 8/2013 | Fischmann T. | 210/742 |
| 8,524,088 B2 | 9/2013 | Arbogast et al. | |
| 2002/0117430 A1 | 8/2002 | Navarro et al. | |
| 2003/0046933 A1 | 3/2003 | Moss et al. | |
| 2003/0091467 A1 | 5/2003 | Kmec et al. | |
| 2003/0094421 A1 | 5/2003 | Gargas | |
| 2003/0228195 A1 * | 12/2003 | Mizutani | 405/52 |
| 2004/0025269 A1 | 2/2004 | Pichon | |
| 2004/0129644 A1 | 7/2004 | Unhoch | |
| 2004/0211450 A1 | 10/2004 | Stoltz | |
| 2004/0217326 A1 | 11/2004 | Souter et al. | |
| 2004/0226896 A1 | 11/2004 | Lovestead et al. | |
| 2005/0009192 A1 * | 1/2005 | Page | 436/55 |
| 2005/0145552 A1 | 7/2005 | Sheets | |
| 2005/0194322 A1 | 9/2005 | Palmer | |
| 2005/0207939 A1 * | 9/2005 | Roussi et al. | 422/68.1 |
| 2006/0054568 A1 | 3/2006 | Jones et al. | |
| 2006/0169322 A1 | 8/2006 | Torkelson | |
| 2006/0174430 A1 | 8/2006 | Pareti | |
| 2007/0059562 A1 | 3/2007 | Hattori et al. | |
| 2007/0181498 A1 | 8/2007 | Kaas | |
| 2007/0181510 A1 | 8/2007 | Harvey et al. | |
| 2008/0116142 A1 | 5/2008 | Fischmann Torres | |
| 2008/0295615 A1 * | 12/2008 | Sihalla | 73/863.02 |
| 2009/0050572 A1 | 2/2009 | McGuire et al. | |
| 2009/0087549 A1 | 4/2009 | Zhou et al. | |
| 2010/0320147 A1 | 12/2010 | McGuire et al. | |
| 2011/0009019 A1 * | 1/2011 | Neira et al. | 441/1 |
| 2011/0061194 A1 | 3/2011 | Fischmann Torres | |
| 2011/0062067 A1 | 3/2011 | Fischmann Torres | |
| 2011/0132815 A1 * | 6/2011 | Angelilli et al. | 210/88 |
| 2011/0210076 A1 | 9/2011 | Fischmann Torres | |
| 2012/0024769 A1 | 2/2012 | Marin et al. | |
| 2012/0091069 A1 | 4/2012 | Fischmann T. | |

FOREIGN PATENT DOCUMENTS

| | | |
|---|---|---|
| DE | 2 141 460 | 2/1973 |
| DE | 38 44 374 | 7/1990 |
| DE | 19515428 | 11/1996 |
| DE | 297 16 994 | 1/1998 |
| DE | 198 14 705 | 10/1998 |
| DE | 198 60 568 | 12/1998 |
| DE | 10 2010 019 510 | 11/2011 |
| EP | 0 352 487 | 1/1990 |
| EP | 0 468 876 | 1/1992 |
| EP | 0 483 470 | 5/1992 |
| EP | 1 420 130 | 5/2004 |
| EP | 168 85 62 | 8/2006 |
| ES | 200 14 29 | 5/1998 |
| FR | 2 544 005 | 10/1984 |
| FR | 2 668 527 | 4/1992 |
| FR | 2 685 374 | 6/1993 |
| FR | 2 740 493 | 4/1997 |
| FR | 2 785 898 | 5/2000 |
| GB | 1494005 | 12/1977 |
| GB | 2045606 | 11/1980 |
| GB | 2 243 151 | 10/1991 |
| JP | 59-012287 | 1/1984 |
| JP | 59-222294 | 12/1984 |
| JP | 4-115008 | 4/1992 |
| JP | 5-220466 | 8/1993 |
| JP | 04073612 | 8/1993 |
| JP | 5-261395 | 10/1993 |
| JP | 7-310311 | 11/1995 |
| JP | 3026643 | 1/1996 |
| JP | 10-169226 | 6/1998 |
| JP | 2001-3586 | 1/2001 |
| JP | 2001-9452 | 1/2001 |
| JP | 2002-90339 | 3/2002 |
| JP | 2002-282860 | 10/2002 |

(56) References Cited

FOREIGN PATENT DOCUMENTS

| | | |
|---|---|---|
| JP | 2003-190989 | 7/2003 |
| JP | 2003-200173 | 7/2003 |
| JP | 2004-958 | 1/2004 |
| JP | 2005-288392 | 10/2005 |
| JP | 2006-68624 | 3/2006 |
| JP | 2007-500073 | 1/2007 |
| JP | 2011-5463 | 1/2011 |
| KR | 20-0162956 | 9/1999 |
| TW | 432013 | 8/1987 |
| TW | 482186 | 12/1990 |
| UY | 30184 | 5/2007 |
| WO | WO 8101585 | 6/1981 |
| WO | WO 9848132 | 10/1998 |
| WO | WO 03/010388 | 2/2003 |
| WO | WO 2006/069418 | 7/2006 |
| WO | WO 2007/029277 | 3/2007 |
| WO | WO 2007/059562 | 5/2007 |
| WO | WO 2009/114206 | 9/2009 |
| WO | WO 2010/074770 | 7/2010 |

OTHER PUBLICATIONS

Ambient Water Quality Criteria for Bacteria—1986, Jan. 1986, US EPA, EPA440/5-84-002, p. 16.
Chilean Examiner's report from Application No. 3900-08 issued Aug. 31, 2009.
Communication from EPO for corresponding application No. 09835402.0 dated Jan. 30, 2013.
Non-Final Office Action mailed Jul. 19, 2011 from U.S. Appl. No. 13/076,151.
Final Office Action mailed Nov. 28, 2011 from U.S. Appl. No. 13/076,151.
Non-Final Office Action mailed Jun. 13, 2013 from U.S. Appl. No. 13/076,151.
Non-Final Office Action mailed May 15, 2013 for U.S. Appl. No. 12/937,505.
Non-Final Office Action mailed Jul. 31, 2013 for U.S. Appl. No. 13/886,615.
Non-Final Office Action mailed Jul. 26, 2013 for U.S. Appl. No. 13/861,262.
Non-Final Office Action mailed Sep. 6, 2013 for U.S. Appl. No. 13/948,619.
Non-Final Office Action mailed Jul. 1, 2013 for U.S. Appl. No. 13/856,387.
Eurasian Office Action for corresponding application No. 201001477/31 and response to Office Action dated Apr. 2, 2013 with English Translation.
European Search Report from European Application No. 07 07 5995 mailed Mar. 9, 2010.
International Search Report and Written Opinion for International Application No. PCT/US2011/051229 mailed Feb. 8, 2012.
International Search Report and Written Opinion for International Application No. PCT/US2011/051236 mailed Jan. 26, 2012.
International Search Report and Written Opinion for International Application No. PCT/US2011/051244 mailed Jan. 25, 2012.
International Search Report and Written Opinion for PCT/EP2012/076170 mailed Aug. 7, 2013 (12 pages).
International Search Report mailed May 6, 2009, in co-pending related PCT Application No. PCT/US2009/036809.
Japanese Office Action for corresponding application No. 2007-299975 dated May 31, 2011—translation provided.
Norwegian Search Report from Norwegian Application No. 20075880 dated Feb. 4, 2010.
Pakistan Examination Report.
Panama Search Report from Panama Application No. 87176-01 dated Mar. 17, 2010.
Panama Search Report from Panama Application No. 88509-01 dated Oct. 7, 2010.
Peruvian Technical Report for corresponding application No. 000244-2007 dated Sep. 2, 2010—translation provided.
Response filed for EP 09835402.0 dated Aug. 14, 2013. (9 pages).
Response filed for EP 09835402.0 dated Jul. 23, 2013. (11 pages).
Second Singapore Office Action for corresponding application No. 200717963-3 dated Dec. 23, 2010.
Singapore Office Action for corresponding application No. 200717963-3 dated Dec. 23, 2010.
World Health Organization: Guidelines for safe recreational waters. vol. 2. Swimming pools and similar recreational water environments. Switzerland. Jun. 27, 2006 ISBN 92-4-154680-8 Chapter 4.
World Health Organization: Guidelines for safe recreational waters. vol. 2. Swimming pools and similar recreational water environments. Switzerland. Jun. 27, 2006 ISBN 92-4-154680-8 Chapter 5.

\* cited by examiner

LOCALIZED DISINFECTION SYSTEM FOR LARGE WATER BODIES

This application is a Continuation Application of PCT/EP2012/076170, filed 19 Dec. 2012, and which application is incorporated herein by reference. To the extent appropriate, a claim of priority is made to the above disclosed application.

FIELD OF THE INVENTION

The present disclosure relates to a method for controlling the microbiological properties of a portion of water within large water bodies, by focusing on treating such portion of water, where said portion of the large water body complies with specific microbiological sanitary conditions. The present disclosure allows people to use large water bodies for recreational purposes in a safe manner, avoiding the treatment of the total water body. The method also comprises dispensing chemicals governed by a parameter determination method based on the ORP, the temperature, the salinity, and optionally the diffusion of chemicals, and the dilution power of the water as well. This results in using in orders of magnitude less chemicals to treat water and low energy consumption. Thus, the present disclosure can allow people to use certain zones within large artificial or natural water bodies, such as large lakes, lagoons, reservoirs, dams, spas, ponds, or the sea; for recreational purposes in a safe manner, overcoming the limitation or impossibility of treating the whole water body.

BACKGROUND

Several studies throughout the world show that the water quality found in several large water bodies, such as lakes, reservoirs, dams, and the sea, have bacteriological and physical characteristics that do not comply with safety standards and or water quality required for recreational purposes. Therefore, the use of such large water bodies for recreational purposes can pose health threats to the people, and adversely effect the surrounding communities and geographies.

Water pollution can relate to the change in the chemical, physical and biological characteristics of a water body due to human activity. As the world's population has grown exponentially over the years, it demands more living and recreational space, therefore using natural or artificial water bodies for different purposes. The increasing population is occupying the periphery of large cities, increasing land demand and related utilities. Furthermore, the number of industries has multiplied, which has caused several environmental consequences that also affect the quality of such large water bodies.

One contributor to poor water quality is water pollution. Water can be contaminated by sewage disposal, industrial contamination, overdevelopment on the edge of water bodies, runoff from agriculture and urbanization, air pollution, etc. Also, higher temperatures can adversely affect the microbiological and physical properties of water and allow for a rapid proliferation of microorganisms that may negatively affect the human health. These examples can cause the water quality to drop below the standards required for recreational water.

The effects of water pollution include the impact over the health of living organisms within the water bodies, and eventually the health of humans that can use such water for direct or indirect purposes.

Also, the amount of nutrients entering large water bodies has intensified greatly over the years, mainly due to increased urbanization and agriculture, leading to an increased microbiological growth or eutrophication of the water body. Under eutrophic conditions, the amount of nutrients causes the metabolic rate of aquatic plants to increase, thus increasing the biochemical oxygen demand and reducing the water's dissolved oxygen levels. Moreover, the temperature also affects the water's dissolved oxygen level, as warm water has a reduced capability of holding dissolved oxygen. Therefore, combining both oxygen reduction effects, such as larger amount of nutrients and higher temperatures, results in a weakening of the organisms as they become more susceptible to diseases, parasites, and other pollutants. All of such problems produce a negative influence on the water quality, causing the proliferation of algae and other microorganisms, which later die and create an unsafe recreational environment for the people. Also, global warming will tend to increase this kind of problem throughout the world.

Many studies and analysis have been performed on large water bodies used for recreational purposes. Large water bodies are used for a wide variety of recreational purposes that include bathing, waterskiing, windsurfing, boating, and many other activities. However, several water bodies used for such recreational purposes do not comply with specific microbiological sanitary conditions applied to the water body. For example, an EPA study was performed on more than 1,000 lakes across the U.S. to analyze the potential risks of using such lakes for direct-contact recreational purposes, and it was found that more than 30% of all the lakes potentially have wide ranging impacts on human health, and over 41% of lakes pose a high or moderate exposure potential to algal toxins. Also, it has been found that microbial counts and toxin concentrations are greater in near shore residuals than in open water areas.

Many countries throughout the world have regulations for using bodies of water for direct contact recreational purposes, such as bathing, in safe and hygienic conditions, and there are generally two types of regulations regarding recreational use of such water bodies. The first type of regulation is directed to swimming pools, and essentially requires maintaining a high permanent chlorine buffer in order to maintain low microorganisms levels and also to avoid the contamination of the water when new bathers enter the swimming pool. The chlorine buffer neutralizes contaminants and kills microorganisms brought to the swimming pool water by bathers, amongst many other pollutants, thus maintaining a high water quality suitable for recreational purposes. The second type of regulation applies to natural or artificial large water bodies, such as lakes, the sea, lagoons, reservoirs, or dams, among other large water bodies, and it is referred to as the criteria for bathing with full body contact for recreational waters. This regulation is based on the diluting power of water. When the water has acceptable microorganisms' levels, and new bathers enter into a body of water, the contaminants are diluted in such way that the contaminants do not attain a concentration in the body of water that causes significant effects. Therefore, in large water bodies, a disinfectant buffer is not needed due to the high diluting power of the large water volume, and because of its natural capacity to maintain sanitary conditions.

Direct-contact recreational water regulations, like the one applied to lakes, the sea, lagoons or dams; require the water quality to comply with several standards that allow the safe use of such bodies. In order to evaluate the suitability of the large water bodies for direct-contact recreational purposes, the most important standards are the microbiological parameters of the water. For example, the EPA (Environmental Protection Agency) criteria for bathing with full body contact in recreational waters points out that as for freshwater, *E. Coli* must not exceed 126 CFU per 100 ml of water, and that

*Enterococci* must not exceed 33 CFU per 100 ml of water. For seawater, the EPA rules that the *Enterococci* must not exceed 35 CFU per 100 ml of water. As another example, in Chile, the Norm NCh1333 for direct-contact recreational waters states that the water must not contain over 1000 CFU of fecal coliforms per 100 ml of water (including *E. Coli*, among others). Therefore, strict norms apply when such large water bodies are used for direct-contact recreational purposes.

It is therefore a significant challenge to obtain such required specific microbiological conditions in large water bodies which are currently unsuitable for recreational purposes, as the application of large quantities of chemical agents and disinfectants throughout the complete large water body to comply with specific microbiological sanitary conditions is unfeasible technically, economically and environmentally. Thus, the treatment of the complete water body to comply with specific microbiological sanitary conditions applied to the water body is impossible most of the times.

Also, although some water bodies can comply with microbiological regulations for direct contact recreational waters, or more stringent regulations applied to the water body, there are pathogenic organisms such as protozoa, and specifically amoebas, among others, that can be present in such water bodies especially in low salinity waters or high temperature waters. Therefore, there are no guarantees that maintaining bacteriological regulations for direct contact recreational waters, can allow safe bathing conditions permanently.

Currently, water treatment technologies applied to swimming pools require the addition of chemical agents to maintain a permanent chlorine buffer of at least 1.5 ppm or to maintain a permanent ORP of at least 750 mV. Currently, there are no known practical methods to treat large water bodies contaminated by microorganisms, such as lakes, the sea, lagoons, reservoirs, or dams because current methods are technically, economically, and environmentally unviable for large water bodies. The ORP has increasingly become a primary approach to standardizing water disinfection parameters. The metabolism of microorganisms and consequently their ability to survive and propagate are influenced by the ORP (Oxidation Reduction Potential) of the medium in which they live. From a bacteriological point of view, an oxidizing compound removes and accepts the electrons from the cell membrane (reduction-oxidation reaction), causing the cell to become unstable and leading to a rapid death.

The Oxidation Reduction Potential (ORP), i.e., the tendency of a chemical compound to acquire electrons from another species, may be controlled by the addition of different disinfectants that allow treating the water and the killing of dangerous microorganisms that can create an unsafe environment for recreational purposes. Also, the temperature of the water carries an important role on its bacteriological characteristics and microorganism proliferation, where microorganism proliferation tends to increase at higher temperatures. Furthermore, the salinity of the water also carries an important role on its bacteriological properties, as some microorganisms require specific salinity levels in order to be able to proliferate, and do not withstand mediums with different salinities. For example, some pathogenic protozoa only grow in water with salinities lower than 2% in weight, therefore for higher salinities such microorganisms will not grow nor proliferate.

Swimming pool water treatment technologies require the addition of large quantities of chemical agents, in order to maintain suitable disinfection parameters. For large water bodies, the application of current swimming pool disinfecting technologies is unviable technically and economically, because of the large amount of chemicals that would be needed, and that would cause important environmental damage.

Currently, there are no known practical methods to disinfect large water bodies, and treating such large water bodies, such as lakes, the sea, lagoons, reservoirs, or dams. If traditional disinfection technologies are utilized, a proper treatment and disinfection would be technically, economically, and environmentally unviable. Therefore, it is desired to provide a method for treating large water bodies, and preferably defined portions thereof in order to provide a zone that complies with specific microbiological sanitary conditions, and using them for recreational purposes in a safe way.

Therefore, there is an unresolved problem regarding recreational uses on natural or artificial large water bodies such as lakes, lagoons, the sea, or dams, with poor water quality. The microbiological characteristics of such large water bodies must comply with direct-contact water regulations or more stringent regulations that apply to the particular water body, in order to allow the safe practice of recreational purposes within the water bodies, and also to avoid any health threats to the community or nearby terrains, which currently does not occur in many of the large water bodies throughout the world.

STATE OF THE ART

U.S. Pat. No. 6,231,268 discloses a method and apparatus for treatment of large water bodies by directed circulation, where the device and method from U.S. Pat. No. 6,231,268 is directed to maintain water circulation within large water bodies to avoid lack of oxygen, stagnant areas, freezing, and other non-uniform conditions. U.S. Pat. No. 6,231,268 does not mention nor disclose a method for treating a portion of water within a large water body in order to comply with specific micro-bacteriological sanitary conditions, but only discloses a method for maintaining circulation within the large water body. The method from U.S. Pat. No. 6,231,268 does not apply chemicals through diffusor means in order to create a sanitary-compliant zone, but maintains a circulation within the water body, which would disperse the chemicals throughout the water body, not allowing the creation of a sanitary-compliant zone.

U.S. Pat. No. 6,317,901 discloses a fresh or saltwater pool, where the pool is created over a natural or artificial water body that allows using the water from such body to avoid the contamination due to soil or other sediments contained in the large water body by means of physical barriers that allow the passing through of water and not contaminants, which requires the installation of physical containing means within the large water body.

Patent CN 102092824 discloses a water circulation system for ponds, lakes, municipal tanks, and other water bodies, where the water circulation system allows creating a flow from the bottom water to the surface water, avoiding the eutrophication of the water body. Patent CN102092824 does not mention nor disclose a method for controlling the microbiological properties of a portion of water within the large water bodies, in order to create sanitary-compliant zones that allow recreational purposes.

SUMMARY

Surprisingly, the present disclosure controls the microbiological properties in large water bodies by treating a portion of the large water body, where the portion of the large water body complies with specific microbiological sanitary conditions without having to treat the whole water body, providing thus a sanitary-compliant zone, which is located in order to cover the area being used for recreational purposes, allowing the water quality to comply with specific microbiological sanitary conditions.

The method allows treating a small part of the total water volume. Therefore, the method requires only a small amount of chemicals as well as low consumption of energy due to the use of dispenser means that allow creating safe sanitary-compliant zones without needing to treat the entire water body. Thus, the present disclosure can allow people to use certain zones within large water bodies for recreational purposes in a safe manner, overcoming the limitation or impossibility of treating the whole water body, but only treating the zone that will be used for such purposes, and also allows using countless lakes, seashores, lagoons, and many water bodies that are unusable today due to safety or sanitary problems, generating unprecedented recreational and touristic opportunities that can change the lifestyle of people around the world.

The method can be performed on natural or artificial large water bodies, such as lakes, the sea, estuaries, reservoirs, dams, and lagoons. Also, the water contained in such large water bodies can be fresh water, brackish water, salty water, or sea water.

Accordingly, in some embodiments, the present disclosure relates to a method for controlling the microbiological properties of water by identifying a portion of the water. The method further includes maintaining at least a minimum ORP in the water for at least a minimum period of time depending on the salinity and the temperature of the water, and dispensing chemical agents in order to maintain at least the minimum ORP at least during the minimum period of time. The dispensation of chemical agents may preferably be performed through dispenser means that allow creating safe sanitary-compliant zones. The dispensation of chemical agents may additionally be based on the diffusion of chemicals in the water and the dilution power in the water.

In one embodiment, the method of the present disclosure includes:
a. identifying a portion of water intended for recreational purposes within the large water body and defining dispenser means;
b. maintaining at least a minimum ORP level in such portion of water for at least a minimum period of time, wherein the minimum ORP level and the minimum period of time cannot be lower than the values calculated by:
  i. determining the most unfavorable zone within the portion of water;
  ii. determining the salinity of the water at the most unfavorable zone;
  iii. determining the minimum ORP value based on the salinity of the water where:
    for salinities in the water between 0% and up to 1.5% the minimum ORP level is 550 mV;
    for salinities in the water higher than 1.5%, and up to 2.5%, the minimum ORP level is calculated by the following equation:

$$[\text{Minimum ORP,mV}]=625-50*[\text{Salinity of the Water, \%(Weight Percent)}]; \text{ and}$$

for salinities in the water higher than 2.5%, the minimum ORP level is 500 mV; and
  iv. determining the temperature of the water in the most unfavorable zone; and
  v. determining the minimum period of time based on the water temperature, where:
    for water temperatures from 5° C. to 35° C., the minimum period of time is calculated by the following equation:

$$[\text{Minimum period of time,min}]=80-2*[\text{Temperature of the water,° C.}]; \text{ and}$$

for water temperatures between 35° C. and up to 45° C., the minimum period of time is calculated by the following equation:

$$[\text{Minimum period of time,min}]=5*[\text{Temperature of the water,° C.}]-165;$$

c. dispensing an effective amount of chemical agent in order to maintain at least the minimum ORP level during at least the minimum period of time at the most unfavorable zone, and
d. Repeating step c in order to avoid the ORP in the most unfavorable zone to decrease by more than 20% of the minimum ORP value.

BRIEF DESCRIPTION OF THE FIGURES

The accompanying drawings, which are incorporated herein and constitute a part of this disclosure, illustrate various embodiments of the present invention. In the drawings.

In accordance with common practice, the various described features are not drawn to scale but are drawn to emphasize specific features. Reference characters denote like features throughout the Figures.

DETAILED DESCRIPTION

The following detailed description refers to the accompanying drawings. While some embodiments may be described, modifications, adaptions, and other implementations are possible. For example, substitutions, additions, or modifications may be made to the elements illustrated in the drawings, and the methods described herein may be modified by substituting, reordering, or adding steps to the disclosed methods. Accordingly, the following detailed description does not limit the scope of the disclosure. While systems and methods are described in terms of "comprising" various apparatus or steps, the systems and methods can also "consist essentially of" or "consist of" the various apparatus or steps, unless stated otherwise.

DEFINITIONS

In the light of the present disclosure, the following terms or phrases should be understood with the meanings described below:

As used herein, the general types of water and their respective Total Dissolved Solids (TDS) concentration (in mg/L) are: Fresh, with TDS≤1,500; Brackish, with 1,500<TDS≤10,000; Salty, with 10,000<TDS≤30,000; and Seawater, with TDS>30,000. The TDS can be measured for example using a conductivity meter or by applying gravimetric methods evaporating the solvent and weighing the mass of residues left.

As used herein, "sanitary-compliant zone" refers to the portion of water, within the large water body, which is established for recreational purposes, and required to comply with specific microbiological sanitary conditions, when used for recreational purposes or when it is needed. It must be noted that the sanitary-compliant zone may not be permanently the same physical zone, but it may change according to the requirements of the people for recreational purposes.

As used herein, "specific microbiological sanitary conditions" refers to the microbiological properties/conditions that need to be achieved within the sanitary-compliant zone in order to allow recreational purposes. Such conditions can be determined by specific local, state, federal regulations for reducing certain specific organisms, or different predetermined specific conditions.

As used herein, "minimum ORP level" refers to the minimum ORP that can be allowed in the most unfavorable zone, in order to properly control microbiological properties in such zone.

As used herein, "minimum period of time" refers to the minimum amount of time that the minimum ORP level of the water at the most unfavorable zone must be maintained, in order to allow the required sanitary conditions.

As used herein, the "delimiting zone" corresponds to a virtual zone that delimits the sanitary-compliant zone, and does not require a physical barrier.

As used herein, the "most unfavorable zone" corresponds to the zone that shows the lowest ORP values within the identified portion of water, especially after applying a determined amount of chemical agents. The most unfavorable zone is often, but not necessarily always, found on the delimiting zone of the identified portion of water and the farthest from the chemical dispenser.

As used herein, the "dispenser means" refer to any means for applying one or more chemical agents to the water, and may be selected from the group consisting of an injector, diffusor, sprinkler, weight dispenser, piping, manual application, and combinations thereof; pipes; valves; and connecting elements that allow the proper application of chemicals into the established portion of water to be treated.

As used herein, the "chemical agents" that are applied to the water body refer to any chemical agent that allows achieving the desired ORP level in the water. The "effective amount of chemical agents" corresponds to the minimum amount of chemicals that can be applied to the water in order to maintain at least the minimum ORP level during at least the minimum period of time at the most unfavorable zone.

Methods of the Present Disclosure

The present disclosure allows controlling the microbiological properties in large water bodies by treating a portion of the large water body, so that said portion of the large water body complies with specific microbiological sanitary conditions when required, thus overcoming the limitation or impossibility of treating the whole water body. Sanitary-compliant zones are created, which are strategically located in order to widely cover the area being used for recreational purposes.

The disclosed method requires a smaller amount of chemicals and reduced energy consumption because it does not require treating the complete water body with this specific method (the water body may be subject to other treatments different to the disclosed method). Thus, the present disclosure allows people to use certain zones within large water bodies for recreational purposes in a safe manner, and overcomes the economic, technical and environmental limitation or impossibility of treating the whole water body, and also allows using countless lakes, seashores, lagoons, and many water bodies that are unusable today due to safety or sanitary problems, generating unprecedented recreational and touristic opportunities that can change the lifestyle of people around the world.

The disclosed methods can be performed on natural or artificial large water bodies, such as lakes, the sea, estuaries, reservoirs, dams, and lagoons. The disclosed methods can be used with different water types including fresh, brackish, salty, and sea water. In one embodiment, the method for controlling the microbiological properties of a portion of water within large water bodies includes:

a. identifying a portion of water intended for recreational purposes within the large water body and defining dispenser means;

b. maintaining at least a minimum ORP level in such portion of water for at least a minimum period of time, wherein the minimum ORP level and the minimum period of time cannot be lower than the values calculated by:

i. determining the most unfavorable zone within the portion of water;

ii. determining the salinity of the water at the most unfavorable zone;

iii. determining the minimum ORP value based on the salinity of the water where:

for salinities in the water between 0% and up to 1.5% the minimum ORP level is 550 mV;

for salinities in the water higher than 1.5%, and up to 2.5%, the minimum ORP level is calculated by the following equation:

[Minimum ORP,mV]=625−50*[Salinity of the Water, %(Weight Percent)]; and for salinities in the water higher than 2.5%, the minimum ORP level is 500 mV; and iv. determining the temperature of the water in the most unfavorable zone; and v. determining the minimum period of time based on the water temperature, where for water temperatures from 5° C. to 35° C., the minimum period of time is calculated by the following equation:

[Minimum period of time,min]=80−2*[Temperature of the water,° C.]; and for water temperatures between 35° C. and up to 45° C., the minimum period of time is calculated by the following equation:

[Minimum period of time,min]=5*[Temperature of the water,° C.]−165;

c. dispensing an effective amount of chemical agent in order to maintain at least the minimum ORP level during at least the minimum period of time at the most unfavorable zone, and d. Repeating step c in order to avoid the ORP in the most unfavorable zone to decrease by more than 20% of the minimum ORP value.

The location of the most unfavorable zone, the water salinity and temperature of the water may vary independently from each other as a result of external conditions. Thus, the method of the disclosure may optionally comprise a further step e., where steps b., c. and d. are carried out once again or repeatedly.

To determine the zone that must comply with specific microbiological sanitary conditions applied to the water body, a strategic analysis could be done in order to provide an accessible zone that can allow safe recreational purposes.

The dispensation of the chemical agent, preferably through dispenser means, is controlled by a parameter determination method that combines the effects of the ORP of the water, its salinity and its temperature. Optionally, the diffusion of chemicals, and the dilution power of the water may be further considered in the parameter determination method. Due to the combined effect of the disinfection properties of the water (ORP), the resistance of certain microorganisms depending on the salinity of the water, the temperature, and optionally the dilution power of the water, the present disclosure allows to use much less chemical agents than required by swimming pools in order to comply with specific microbiological sanitary conditions applied to the water body, which was a result of extensive research. In the state of the art, there are currently two ways for maintaining a water quality compliant with specific microbiological sanitary conditions applied to the water body, which relate to the addition of large quantities of disinfection agents, or instead relying on the dilution power of the water. The present disclosure combines both effects in order to make the most of their synergies and thus provide an effective and sustainable method for zones that comply with specific microbiological sanitary conditions.

Identifying the Portion of Water to be Treated

Figure 1:
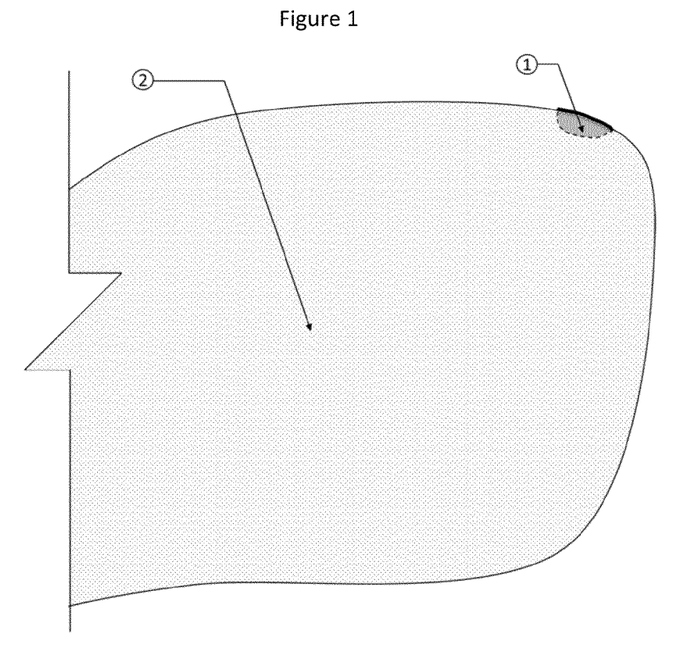
FIG. 1 shows a top view of a small section of the large water body (2), and the sanitary-compliant zone (1).
Figure 2:
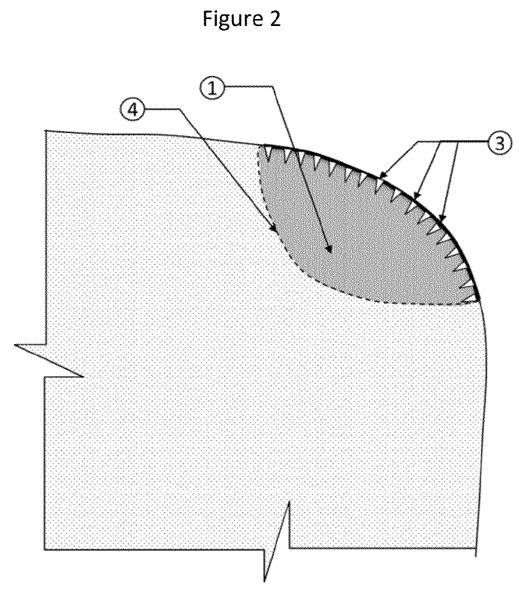
FIG. 2 shows a top view of an even smaller section of the large water body, and in particular, the sanitary compliant zone (1), the dispenser means (3) and the delimiting zone (4).

The location of the portion of water to be treated, which after the process of the invention will be designated as the sanitary-compliant zone, can be determined by strategically identifying the portion of the water most likely to be used for recreational purposes. This location can be determined by examining where users are likely to enter the water, the depth of the water, the purpose of the water (e.g., bathing, swimming, skiing, boating, fishing, etc.), the temperature of the water, and the like. For example, if a body of water is located next to a hotel, the sanitary-complaint zone will likely be the portion of the water next to the hotel where users are most likely to enter the water. This is shown in FIGS. 1 and 2, which show the sanitary-compliant zone 1 located on an edge of the large water body 2. In other cases, the sanitary-complaint zone can be in the center of a body of water and surrounded by the large water body. In some cases, the sanitary-compliant zone may correspond to a recreational area that is visually roped off or otherwise physically separated from the rest of the water (e.g., fenced off, partitioned off with a wall).

Referencing FIGS. 1 and 2, the zone 1 complies with predetermined sanitary conditions. As discussed, the sanitary conditions may be determined by local, state, or federal regulations or different predetermined specific conditions. Exemplary regulations for recreational water state that *E. Coli* must not exceed 126 CFU per 100 ml of water, and that *Enterococci* must not exceed 33 CFU per 100 ml of water. For seawater, the EPA regulations state that *Enterococci* must not exceed 35 CFU per 100 ml of water. In Chile, the Norm NCh1333 for direct-contact recreational waters state that the water must not contain over 1000 CFU of fecal coliforms per 100 ml of water (including *E. Coli*, among others). Alternatively, the sanitary conditions or microbial properties may be determined by referencing the concentration of certain microorganisms. In any case, the sanitary-compliant zone 1 meets the sanitary conditions, while the rest of the water volume 2 may not comply with specific sanitary conditions applied to the sanitary-compliant zone.

Additionally, the sanitary-complaint zone may include one or more dispensers 3 for dispensing chemical agents where the rest of the water body 2 may not include the dispensers 3.

The sanitary-compliant zone is virtually bounded by the delimiting zone 4. The delimiting zone 4 is a virtual barrier that may comprise but does not require a physical barrier.

The present disclosure does not require circulating water throughout the various zones—sanitary-compliant zone, delimiting zone, and most unfavorable zone. In fact, in some embodiments, the water is specifically not circulated. For the large water bodies described herein, it may be economically, technically and environmentally unviable to circulate the water within the large water body. The present disclosure treats the water in the identified portion of water with chemical agents to allow such zone to comply with specific microbiological sanitary conditions for such area. While dispersion of the chemical agents from the sanitary-compliant zone to other zones may naturally occur within the water body, it is not required by the present disclosure. Therefore, in some embodiments, maintaining water circulation throughout the complete water body would be counterproductive with the disclosed methods.

After the portion within the large water body to be used for recreational purposes has been identified or established, the dispenser means, which are controlled by a parameter determination method based on the ORP of the water, its salinity, its temperature, and optionally the diffusion of chemicals as well as the dilution power of the water, may be defined.

The dispenser means 3 may be selected from one or more than one diffusors, injectors, sprinklers, dispensers by weight, piping, manual application, or combinations thereof. The dispenser means are adapted to discharge an effective amount of chemicals into the water body; and also may comprise the required equipment to allow its proper operation, such as pipes, valves, and connecting elements.

In order to create the zones that comply with specific microbiological sanitary conditions applied to the water body, chemical concentrations must be applied according to a parameter determination method based on the ORP, the salinity, the temperature, and optionally the diffusion of chemicals and the dilution power of the water as well. The chemicals may preferably be applied by dispenser means 3 that are defined in order to cover the water volume used for recreational purposes.

It must be noted that the present disclosure does not require a physical barrier in order to contain the portion of water to be treated, but instead chemical concentrations are applied to the portion of water in order to comply with specific microbiological sanitary conditions applied to such area the water body.

The dispenser means are controlled by a parameter determination method based on the ORP of the water, its salinity, its temperature, as well as optionally the diffusion of chemicals and the dilution power of the water. The dispenser means applies chemicals into the water in order to allow proper diffusion conditions within the water body and comply with specific microbiological sanitary conditions applied to the water body. The dispenser means may be strategically configured, and positioned relative to and/or with the portion of water intended for recreational purposes in order to provide the required chemical concentrations at the sanitary-compliant zone.

Number and Location of Dispensers

In one embodiment, the dispensers are located or used in order to cover the water volume in the sanitary-compliant zone. The number and location of the dispensers for dispensing the chemical agents may be determined by the specific conditions of each portion of water that will be treated. The total amount of dispensers can be calculated according to the chemical flow that is to be applied to the water body, and such chemical flow may be divided into a series of dispensers in order to allow its homogeneous application throughout the portion of water to be treated.

For example, for treating the same portion of the water body, there is an effective amount of chemicals to be added. The effective amount may preferably be added through several small-flow dispensers, or just a few large-flow dispensers, depending on several variables such as for example wind, water currents, and many other variables that may influence the homogeneity of the chemical application within the water body.

The dispensers can generally be located on the perimeter of the portion of water that will be treated, in order to fully cover such portion, but they can also have other configurations regarding the specific requirements of the portion of water in order to maintain the homogeneity of the chemical application and allow the chemical diffusion throughout the portion of water.

Types of Dispensers

The types of dispensers that can be used in the disclosed method can be variable according to the requirements for chemical application, and may comprise diluters, injectors, dispensers by weight, manual application, manifolds, piping, sprinklers, nozzles, or combinations thereof. The dispensers used in the disclaimed method are preferably nozzles, and more preferably injectors.

Discharging an Effective Amount of Chemical Agents

Chemical agents are used to create the sanitary-compliant zone by reducing the number of microorganisms in the sanitary-compliant zone to below a predetermined amount. The concentration of the chemical agents in the sanitary-compliant zone can be controlled by the amount of chemical agent dispensed from a single dispenser as well as the total number of dispensers. For example, it may be desirable to dispense less chemical agent from a single dispenser, but to increase the number of dispensers in the sanitary-compliant zone. An example of the use of multiple dispensers is shown in FIG. 2 where a plurality of dispensers 3 are located around the periphery of the sanitary-compliant zone. The number and location of the dispensers for dispensing the chemical agents are determined in order to cover the water volume in the sanitary-compliant zone, in one embodiment.

The dispenser 3 may be a diffusor, injector, sprinkler, dispenser by weight, piping, manual application, or combinations thereof. The dispenser discharges an effective amount chemical agent into the water body. The dispenser also includes any required equipment to allow the dispenser to operate, such as pipes, valves, and connecting elements.

Exemplary chemical agents include antimicrobial agents such as ozone, chlorine, and chlorine compounds, biguanide products, halogen-based compounds, bromine-based compounds, and combinations thereof.

The total amount of chemicals added to achieve a certain ORP level in the water depends on several variables, such as for example the pH, meteorological conditions, rain, levels of use, organic load, salinity, temperature, alkalinity, disinfectant concentration, and/or concentration of metals and contaminants, among many other factors. The ORP is a measure of the tendency for oxidizing or reducing certain species found within the water body, and therefore does not represent the amount of chemical agents contained in the water. ORP measurements present the advantage of measuring not only the concentration of the sanitizer, but also its activity in the water and its effectiveness on killing germs and bacteria.

There are no known equations that can relate the temperature of the water, its salinity, and the dilution power for maintaining a minimum ORP in a certain portion of the water for a minimum period of time according to the diffusion of chemicals in the water, due to the complexity of the variables and its mutual influences, and therefore extensive research was performed. An intricate model must be built in order to estimate the amounts of chemicals to be applied in the water body. Since the portion of water is contained within a large water body, when the chemicals are applied, they will diffuse throughout the portion of water creating a chemical gradient that will be higher near the dispensers and lower near the most unfavorable zone.

It must be noted that when the application of chemicals begins, at first there will be no significant change in the ORP of the water since the chemicals will be oxidizing several other compounds in the water. However, at some point the application will allow generating a residual concentration of chemicals that will help raise the ORP up to the desired levels and thus provide the desired disinfection capacity. Therefore, it must be noted that the chemical consumption is divided into two groups:

The amount of chemicals applied that help oxidizing diverse compounds that do not affect ORP significantly. Such chemical consumption must be determined on-site, as it completely depends on the water quality of the raw water. Also, such concentration could be determined by an intricate model based on the water quality physicochemical parameters.

The amount of chemicals applied that generate a residual concentration in the water and thus increase the ORP in the water. Such chemical concentration can be estimated on site or according to diverse methods depending on water quality and physicochemical conditions or parameters.

Notwithstanding the foregoing and without limiting the invention, the oxidant application ranges for different oxidants vary according to the properties of the water. Usually utilized ranges of some oxidizing agents are the following:

| Oxidant | Range of Application (Residual Concentration) |
| --- | --- |
| Chlorine | 0.01-5 ppm |
| Sodium Hipochlorite | 0.01-2 ppm |
| Bromines | 0.01-2.3 ppm |
| Ozone | 0.01-0.75 ppm |

The applicant will provide some embodiments to estimate the amount of residual chemicals in the water:

a. One could estimate the minimum amount of oxidants that must be applied in the water in order to obtain a certain ORP in the entire portion of water to be treated, assuming the portion of water behaves as a closed body. For example, the minimum amount of chemicals could be estimated in order to achieve a certain ORP in the total volume of the portion of water. For example, if the portion of water has a volume of 1,000 m$^3$, and the portion of water is considered a closed water body, it can be estimated that for achieving an ORP of 550 mV in the water, a residual concentration of 0.07 ppm of sodium hypochlorite must be maintained. In order to obtain the residual concentration of 0.07 ppm, a first dosage of 1.2 ppm of sodium hypochlorite was added in order to meet the chlorine demand of the water and did not generate any residual concentration. Afterwards, a dose of 0.07 ppm was added to obtain the required residual concentration and obtain the desired ORP level of 550 mV. Therefore, the amount of sodium hypochlorite added to the water can be calculated according to its concentration in the water body as follows:

First dose:

$$1.2 \text{ ppm} = 1.2 \frac{\text{ppm sodium hypochlorite}}{\text{liter of water}} \times 1{,}000 \frac{m^3 \times 1{,}000 \text{ liters}}{1 \ m^3}$$

Total Sodium Hypochlorite=1,200 kg

Residual concentration:

$$0.07 \text{ ppm} = 0.07 \frac{\text{ppm sodium hypochlorite}}{\text{liter of water}} \times 1{,}000 \frac{m^3 \times 1{,}000 \text{ liters}}{1 \ m^3}$$

Total Sodium Hypochlorite=70 kg

Therefore, a total amount of 1270 kg of sodium hypochlorite should be added to obtain a homogeneous residual concentration of sodium hypochlorite in the water of 0.07 ppm, and thus obtain an ORP of 550 mV in such zone. Since in reality the portion of water is found within a large water body, the concentration will not be homogeneous, and then the previously calculated dose can be considered as a minimum for obtaining such ORP due to the diffusion of chemicals produced by currents.

b. One could also use the free chlorine method, which allows calculating the ORP of the water based on the pH and the free chlorine concentration in the water. When the pH is maintained at a constant value, there is a linear relationship between ORP and free chlorine. Thus the amount of chemicals required to achieve a certain amount of free chlorine can be calculated subject to the ORP level as follows:

| ORP | pH | Residual Chlorine Concentration |
|---|---|---|
| 600 mV | 7.0 | 0.06 ppm |
|  | 8.0 | 0.20 ppm |
|  | 9.0 | 1.60 ppm |
| 700 mV | 7.0 | 0.30 ppm |
|  | 8.0 | 1.00 ppm |
|  | 9.0 | 2.70 ppm | c. Addition of chemicals with periodic monitoring in order to stop the addition when a certain ORP is reached is a further option. This method is a trial and error method, which allows adding chemicals by periodically monitoring the ORP, and when the desired ORP is reached, the chemical addition must be stopped.

d. Another method used for determining the amount of chemicals consists of taking a small water sample and perform a small-scale test to determine the amount of chemicals that must be applied to achieve a certain ORP level. This method is commonly used and allows estimating the amount of chemicals, although it does not consider diffusion or other variables. Therefore, the results from this method are to be considered as a minimum amount of chemicals required.

In some embodiments, it is desirable to apply additional chemical agents before the ORP level in the most unfavorable zone decreases by about 0.1%, 1%, 5%, 10%, 15%, 20%, 25%, 50%, 75%, or 100%.

In certain embodiments of the invention, where there is an intensive use of the sanitary-compliant zone due to large amounts of people, or if there are many currents that affect the disinfection characteristics of the sanitary-compliant zone, or due to safety or other reasons, the ORP may be maintained permanently within the sanitary compliant zone for certain periods of time.

Also, in certain embodiments of the invention, the water treatment is only utilized when bathers are present in the sanitary-compliant zone, and therefore the treatment may not operate all day nor permanently. For example, the water treatment may operate only during the day, and it can be stopped during the night, when there are no bathers in the sanitary-compliant zone. Therefore, the water treatment method is applied when the sanitary-compliant is effectively used for recreational purposes.

In some embodiments, it may be desirable to improve the water quality in the sanitary-compliant zone by supplying fresh water or water from different portion within the large water body. This may be beneficial, for example, to dilute the effect of contaminants from users but may produce an unwanted diffusion effect on the chemicals.

The minimum effective amount of disinfectant composition may be calculated by the following equations: (Boyce & Hamblin, 1975) (Boyce & Hamblin, 1975)

$$C_\infty(x, y) = \frac{Q_i \cdot C_i}{2 \cdot \pi \cdot Z \cdot D} \exp\left(\frac{U_X}{2 \cdot D}\right) K_0(a \cdot r)$$

$$a = \left[\frac{\gamma}{D} + \left(\frac{U}{2 \cdot D}\right)^2\right]^{1/2}$$

$$r = (x^2 + y^2)^{\frac{1}{2}}$$

Where the above equation is the solution for a point source discharging continuously at a constant volumetric rate $$Q_i \left[\frac{m^3}{s}\right]$$

and at a concentration $C_i$ [μM] at the source in a fluid of depth Z [m], with x [m] and y [m] being the horizontal and vertical distances respectively.

$$D\left[\frac{cm^2}{s}\right]$$

is the diffusion coefficient of the specific chemical in the water, and $K_0$ is the modified Bessel function of the second kind. U [cm/s] is the uniform current of the water body through the x axis, and γ[−] is the decay process of the chemical in a time scale.

Most Unfavorable Zone

In order to comply with specific microbiological sanitary conditions applied to the water body, the most unfavorable zone of the established portion of water is to be determined. The most unfavorable zone corresponds to the one having the lowest ORP values, especially after applying a predetermined amount of chemicals through dispenser means in the established portion of water, and it may be found on the delimiting zone or the furthest from the dispenser means. The predetermined amount of chemicals can be determined on-site and its only purpose is to determine the zone with lowest ORP values within the portion of water to be treated.

If the water body has a surface area smaller than 5 hectares, the most unfavorable zone is usually the central zone of the water body.

A parameter determination method is defined to take in account the different operation conditions of the system. It should be noted that it is unviable to perform constant measures on the water body, thus the present disclosure allows providing a water quality that complies with specific microbiological sanitary conditions without requiring constant measures.

The parameter determination method is based on the water's ORP, its salinity, its temperature, and optionally the diffusion of chemicals and its dilution power within the identified portion of water. The ORP, salinity, and temperature of the water can be determined by empirical methods, such as visual inspection, methods based on experience, and analytical methods. The present disclosure has related these variables and has solved a very complex interaction regarding water quality, after very extensive research.

The salinity can be determined by empirical or analytical methods such as visual tests; salinometers that are based on the conductivity of electricity in the water; hydrometers that are based on the specific gravity of the water; or refractometers that are based on the index of refraction of the water; or may be publically known or can be information from other sources, among others.

The temperature of the water can be determined by empirical or analytical methods such as visual tests; thermometers; thermocouples; resistance temperature detectors; pyrometers; or infrared devices; or may be publically known or can be information from other sources, among others.

The ORP of the water can be determined by empirical or analytical methods, such as using ORP meters that have electrodes in order to measure the voltage across a circuit within the water.

It must be noted that the ORP of the water, its temperature, its salinity, and the dilution power may be previously known or empirically determined, therefore the method from the present disclosure can be applied into the predefined portion of water in knowledge of these variables.

The parameter determination method comprises maintaining at least a minimum ORP level in the most unfavorable zone for at least a minimum period of time in order to ensure the required sanitary conditions throughout the entire established portion of water within the large water body.

The minimum ORP level may depend on the salinity of the water, as certain types of microorganisms, such as some pathogenic protozoa, can only grow and live inside water bodies with maximum salinities of 2% in weight. Therefore, the minimum ORP level may depend on the salinity properties of the water, as for certain salinity concentrations the water will not serve as a media for some microorganisms to grow and thus pose health threats and un-hygienic conditions.

On the other hand, the minimum period of time may also depend on the temperature of the water. The water's temperature is a very important factor for the proliferation of several microorganisms. For low water temperatures, the microorganisms will not proliferate as rapidly as for higher water temperatures, therefore this effect is considered in the present parameter determination method. Until now, there were no known equations that can relate the temperature of the water, its salinity, and the dilution power for maintaining at least a minimum ORP in a certain portion of the water for at least a minimum period of time according to the diffusion of chemicals in the water, due to the complexity of the variables and its mutual influences. Such relations are product of an extensive research, and the minimum ORP level and the minimum period of time that are used for the method of the present invention, in a preferred embodiment, cannot be lower than the values defined as follows:

Minimum ORP Level:

Once the salinity is known from the most unfavorable zone, the minimum ORP level may be calculated by the following equations:
i. for salinities between 0% and up to 1.5% the minimum ORP of the water is at least 550 mV;
ii. for salinities higher than 1.5%, and up to 2.5%, the minimum ORP of the water is calculated by the following equation:

$$[\text{Minimum ORP,mV}]=625-50*[\text{Salinity of the Water, \%(Weight Percent)}]; \text{and}$$

iii. for salinities higher than 2.5%, the minimum ORP of the water is at least 500 mV.

Figure 3:
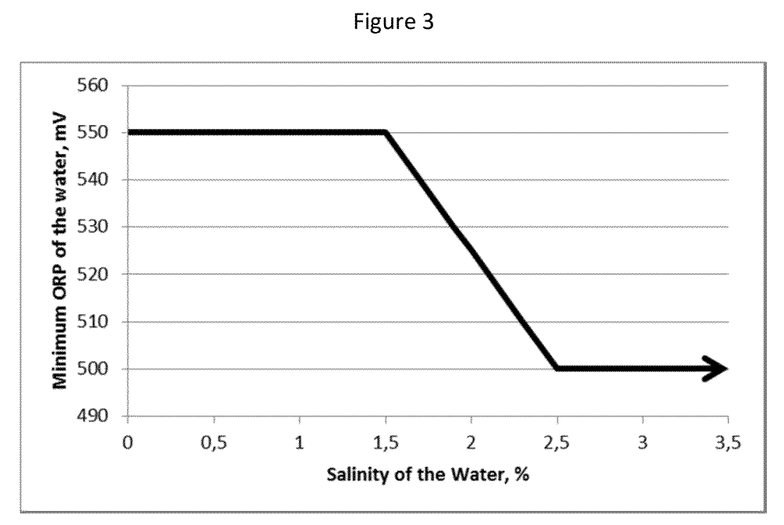
FIG. 3 shows a chart representing the variation of the minimum ORP value of the water according to the water's salinity, as a result from an embodiment of the method of the present invention.

The aforementioned parameter determination method is represented in a graph as shown in FIG. 3.

For example, if the water has a salinity of 1% in weight (or 10,000 ppm) the minimum ORP of the water that has to be maintained, according to this embodiment, will be 550 mV.

On the other hand, if the water has a salinity of, for example, 2% in weight (or 20,000 ppm) the minimum ORP of the water that has to be maintained is 525 mV, according to this embodiment, is calculated using the following equation:

$$[\text{Minimum ORP,mV}]=625-50*[2]=525 \text{ mV}$$

Finally, if the water's salinity is higher than 2.5%, for example 3% in weight, the minimum ORP that has to be maintained is 500 mV.

Minimum Period of Time:

The minimum period of time is determined by the temperature of the water, and it can be calculated by the following equations:
i. for water temperatures between 5° C. and up to 35° C., the minimum period of time is calculated by the following equation:

$$[\text{Minimum period of time,min}]=80-2*[\text{Temperature of the water,}° \text{C.}]; \text{and}$$

ii. for water temperatures higher than 35° C. and up to 45° C., the minimum period of time is calculated by the following equation:

$$[\text{Minimum period of time,min}]=5*[\text{Temperature of the water,}° \text{C.}]-165.$$

Figure 4:
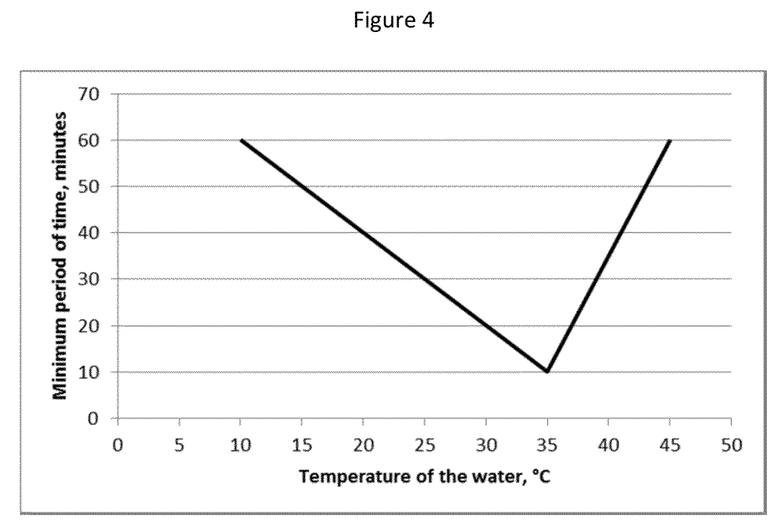
FIG. 4 shows a chart representing the variation of the minimum period of time that the minimum ORP value is maintained according to the water's temperature, as a result from an embodiment of the method of the present invention.

The curve showing how the minimum period of time behaves is shown of FIG. 4.

For example, if the water's temperature is 20° C., the minimum period of time is 40 minutes according to the following equation:

$$[\text{Minimum period of time,min}]=80-2*[20]=40 \text{ minutes}$$

On another hand, if the water's temperature is between 35° C. and 45° C., for example 40° C., the minimum period of time is 35 minutes according to the following equation:

$$[\text{Minimum period of time,min}]=5*[40]-165=35 \text{ minutes}$$

The parameter determination method of the above embodiment is described only in use for water temperatures between 5° C. and 45° C., since any other temperature may not be suitable for recreational purposes.

The parameter determination method may also comprise applying chemicals agents through the dispenser means to avoid the ORP of the most unfavorable zone to be less than the minimum ORP level.

When there are bathers in the sanitary-compliant zone, the ORP of the water will decrease more rapidly than when there are no bathers in the water. Thus, the present parameter determination method allows including the effect of the amount of bathers in the sanitary-compliant zone, which in turn is controlled by the dilution power of the water. The time taken to reach the minimum ORP level will depend on the use of the sanitary-compliant zone and the dilution encountered by the bathers. Therefore, the ORP decreasing rate will depend on the amount of bathers in the water, and thus, on the dilution power of the water.

The variables of water salinity and temperature, ORP, and chemical concentration can vary and be affected by external factors. The disclosed methods allow for some variation in these factors such that constant monitoring of the water salinity, water temperature and recalculation of the minimum ORP and chemical concentration may not be required. Nevertheless, in some embodiments, the water salinity and water temperature can be constantly monitored on either a delay or in real time, and provide feedback to a controller that automatically recalculates the minimum ORP, minimum period of time, and concentration of chemical agent accordingly. In some embodiments, the dispensers may be part of an automatic feedback loop where the dispensers automatically dispense additional chemical agents in response to a decrease in the minimum ORP. In some embodiments, it may be desirable to periodically measure the water salinity and temperature and recalculate the minimum ORP, minimum period of time, and chemical concentration. Such periodic measurements and calculations could take place every 15 minutes, every 30 minutes, every hour, every two hours, six times a day, four times a day, twice a day, once a day, once a week, or as needed.

It must be noted that the present disclosure does not require a physical barrier in order to contain the portion of water to be treated. Rather, chemical concentrations are applied to the portion of water in order to comply with specific microbiological sanitary conditions applied to the water body.

The application of chemicals in order to maintain at least a minimum ORP level during at least the minimum period of time may be repeated before the ORP level decreases by more than 20% of the minimum ORP value in the most unfavorable zone. In an alternative embodiment, the location of the most unfavorable zone, the water salinity and temperature of the water may vary independently from each other as a result of external conditions. Thus, the method of the invention optionally may comprise a further step e., where steps b., c. and d. are carried out once again or repeatedly.

Chemical agents can be added to the established portion of water within the large water body through dispenser means, where the dispenser means is driven by a parameter determination method that combines the effects of ORP of the water, its salinity, its temperature, the diffusion of chemicals, and its dilution power.

The chemical agents are selected from ozone; chlorine and chlorine compounds; biguanide products; halogen-based compounds; bromine based compounds, or a combination thereof.

It is also possible to improve the sanitary-compliant zone's water quality by supplying fresh water or water from different portion within the large water body into such portion in order to allow a dilution effect of bather's load of contaminants.

The following example is not intended to limit the scope of the claims of the invention but is rather intended to be exemplary of certain embodiment. Any variations in the exemplified method which raise to the skilled in the art are intended to fall within the scope of the present invention.

EXAMPLE

The disclosed method was applied in Lake Rapel located in Navidad, Chile. The lake has over 8,000 hectares of surface, and more than 695 million cubic meters of fresh water. The lake is normally used for recreational purposes.

A portion of water within the large water body was established according to the lake's normal recreational use, which covered approximately 650 m$^2$ (corresponding to about 0.0008% of the total lake area). The portion was located on the edge of the lake. The specific microbiological conditions required for this specific experiment corresponded to the microbiological regulations for direct contact recreational waters as determined by the EPA.

Approximately 20 injectors were installed on the north perimeter of the lake. Each injector had a maximum flow of 1.8 liters per hour. The chemical agent used was sodium hypochlorite, which was diluted proportional to the injector flow. A solution of chlorine in water was prepared in a plastic bin with a capacity of 1 m$^3$. The pumping of the sodium hypochlorite solution was performed by an IWAKI magnetic pump with a capacity of 18 liters per minute.

During the experiment, the established portion of water had an average of 60 bathers on an hourly basis.

The determination of the most unfavorable zone was performed by measuring the ORP in several places within the established portion of water using a HANNA ORP HI 98201 ORP test equipment after discharging a predetermined amount of approximately 1.5 liters of a 10% solution of sodium hypochlorite into the established portion of water. The most unfavorable zone was located on the center of the delimiting zone of the established portion of water. The water's salinity was measured with a HANNA HI 93110ON conductivity test. The salinity of the water was found to be 0.07% in weight, and the average water temperature 21° C. as measured by a thermometer.

The minimum ORP level was determined where for salinities between 0% and up to 1.5% the minimum ORP level of the water is at least 550 mV. Therefore, the minimum ORP level of the water with a salinity of 0.07% should be 550 mV.

The minimum period of time was determined, where for water temperatures between 5° C. and up to 35° C., the minimum period of time is calculated by the following equation:

[Minimum period of time,min]=80−2*[Temperature of the water,° C.]

Minimum period of time in minutes=80−2*[21]

Minimum period of time=38 min

Sodium hypochlorite was added through the injectors to maintain a ORP level of at least 550 mV in the most unfavorable zone for a minimum period of 38 minutes. At first, 1 ppm of sodium hypochlorite was added to treat the water. Afterwards, sodium hypochlorite was added in order to maintain a 0.10 ppm residual concentration, which allowed maintaining at least a 550 mV ORP level in the most unfavorable zone.

Once the total amount of sodium hypochlorite was discharged, the ORP of the most unfavorable zone was measured and determined to be 555 mV. Subsequent measures were carried out every 60 minutes. The ORP decreased to 490 mV (by about 11% from the determined minimum ORP) after about 30 minutes, at which point new sodium hypochlorite was dispensed.

The dilution power of the water is reflected in the average amount of bathers per hour in the sanitary-compliant zone: for lower bather's densities, the water's ORP will decrease slower than for higher bather's densities. Also, the decrease in ORP is affected by the sun and other variables.

This example confirmed that the sanitary-compliant zone complied with EPA's specific microbiological regulations for direct contact recreational waters and even more stringent sanitary regulations, and allowed applying a small amount of chemicals by avoiding the treatment of the complete large water body, by treating the identified portion of water in order to create a sanitary-compliant zone.

The chemicals applied in the present example were at least 100 orders of magnitude lower compared to the amount of chemicals required to treat the complete water body. In order to treat the complete water body of Lake Rapel, which holds over 695 million cubic meters of fresh water, and allow its use for recreational purposes, a certain amount of chemicals must be added that can ensure the safety of bathers. In order to maintain the same ORP level as for the example (a concentration of 0.10 ppm of sodium hypochlorite with the additional 1 ppm added beforehand to treat the water), the total amount of sodium hypochlorite that must be applied is approximately 764.5 tons, which is more than 100,000 times the amount of sodium hypochlorite that is required for treating the portion of water from the aforementioned example, which is economically and environmentally unviable.

The invention claimed is:

1. A method for controlling microbiological properties of a portion of water within a water body, comprising:
  a. identifying a portion of water intended for recreational purposes within the water body, the portion of water comprising one or more zones wherein:
    at least one zone is designated a sanitary compliance zone,
    at least one zone is designated a delimiting zone, and
    one zone is designated a most unfavorable zone, the most unfavorable zone corresponding to the zone that exhibits the lowest ORP value within the identified portion of water;
  b. maintaining at least a minimum ORP level in the portion of water for at least a minimum period of time, wherein the minimum ORP level and the minimum period of time cannot be lower than the values calculated by:
    i. determining salinity of the water at the most unfavorable zone; and
    ii. determining the minimum ORP value based on the salinity of the water where:
      for salinities in the water between 0% and up to 1.5% the minimum ORP level is 550 mV;
      for salinities in the water higher than 1.5%, and up to 2.5%, the minimum ORP level is calculated by the following equation:

[Minimum ORP,mV]=625−50*[Salinity of the Water, %(Weight Percent)]; and for salinities in the water higher than 2.5%, the minimum ORP level is 500 mV;
    iii. determining the temperature of the water in the most unfavorable zone; and
    iv. determining the minimum period of time based on the water temperature, wherein:
      for water temperatures from 5° C. to 35° C., the minimum period of time is calculated by the following equation:

[Minimum period of time,min]=80−2*[Temperature of the water,° C.]; and for water temperatures between 35° C. and up to 45° C., the minimum period of time is calculated by the following equation:

[Minimum period of time,min]=5*[Temperature of the water,° C.]−165;

c. dispensing an effective amount of chemical agent into the identified portion of water in order to maintain at least the minimum ORP level during at least the minimum period of time at the most unfavorable zone, and
  d. repeating step c as needed to prevent the ORP in the most unfavorable zone from decreasing by more than 20% of the minimum ORP value.

2. The method of claim 1, further comprising repeating step b.

3. The method of claim 1, wherein the water body is a natural body of water.

4. The method of claim 1, wherein the water body is selected from the group consisting of a lake, sea, estuary, dam, lagoon, spa, pool, pond and reservoir.

5. The method of claim 1, wherein the water is fresh water.

6. The method of claim 1, wherein the portion of water intended for recreational purposes is defined by the delimiting zone.

7. The method of claim 1, wherein the portion of water intended for recreational purposes is located on an edge of the water body.

8. The method of claim 1, wherein the portion of water intended for recreational purposes is located on the interior of the water body.

9. The method of claim 1, wherein the most unfavorable zone presents the lowest ORP value within the portion of water intended for recreational purposes after dispensing chemical agent into the water.

10. The method of claim 1, wherein if the water body has a surface area smaller than 5 hectares, the most unfavorable zone is the central zone of the water body.

11. The method of claim 1, wherein the chemical agent is selected from the group consisting of ozone; chlorine and chlorine compounds; biguanide products; halogen-based compounds; bromine based compounds, and mixtures thereof.

12. The method of claim 1, wherein the chemical agent is dispensed by manual application or using a dispenser selected from the group consisting of an injector, diffusor, sprinkler, weight dispenser, piping, and combinations thereof.

13. The method of claim 1, wherein the ORP, the salinity, and the temperature of the water are determined by empirical methods.

14. The method of claim 1, further comprising supplying water from a different portion within the water body into the portion of water intended for recreational purposes in order to provide a dilution effect.

15. The method of claim 1, further comprising supplying water from different portion within the water body into the portion of water intended for recreational purposes in order to provide a dilution effect of bather's load of contaminants.

16. The method of claim 1, wherein the minimum ORP level is maintained permanently in the sanitary compliance zone.

17. The method of claim 1, further comprising applying the method to the portion of water when bathers are present in the sanitary-compliant zone.

18. The method of claim 1, wherein the water body is an artificial body of water.

19. The method of claim 1, wherein the water is brackish water, salty water, or sea water.

\* \* \* \* \*